US008304685B2

(12) United States Patent
Bunker et al.

(10) Patent No.: US 8,304,685 B2
(45) Date of Patent: Nov. 6, 2012

(54) SYSTEM AND METHOD FOR CONVERTING WELDING POWER TO PLASMA-CUTTING POWER

(75) Inventors: Thomas A. Bunker, Black Creek, WI (US); Joseph C. Schneider, Menasha, WI (US); James F. Ulrich, Grayslake, IL (US)

(73) Assignee: Illinois Tool Works Inc., Glenview, IL (US)

( * ) Notice: Subject to any disclaimer, the term of this patent is extended or adjusted under 35 U.S.C. 154(b) by 1388 days.

(21) Appl. No.: 10/907,773

(22) Filed: Apr. 14, 2005

(65) Prior Publication Data

US 2006/0231532 A1 Oct. 19, 2006

(51) Int. Cl.
*B23K 10/00* (2006.01)
(52) U.S. Cl. .......... 219/121.54; 219/121.39; 219/130.32
(58) Field of Classification Search ............. 219/121.39, 219/121.54, 121.57, 121.44, 121.32
See application file for complete search history.

(56) References Cited

U.S. PATENT DOCUMENTS

| | | | | |
|---|---|---|---|---|
| 4,465,920 A * | 8/1984 | Hoyt et al. ................... 219/133 |
| 4,782,436 A * | 11/1988 | Gilliland .................... 363/56.08 |
| 5,086,205 A * | 2/1992 | Thommes ................ 219/121.54 |
| 5,290,995 A * | 3/1994 | Higgins et al. ........... 219/121.44 |
| 5,355,300 A * | 10/1994 | Zinn .............................. 363/146 |
| 5,406,051 A * | 4/1995 | Lai ............................... 219/130.1 |
| 5,926,381 A * | 7/1999 | Moriguchi et al. .............. 363/17 |
| 6,163,085 A * | 12/2000 | Sigl et al. ......................... 307/43 |
| 6,177,645 B1 * | 1/2001 | Church et al. ........... 219/121.39 |
| 6,181,576 B1 * | 1/2001 | Ikeda et al. ...................... 363/17 |
| 6,236,014 B1 * | 5/2001 | Ulrich ....................... 219/121.57 |
| 6,282,109 B1 * | 8/2001 | Fraidlin et al. .................. 363/89 |
| 6,365,868 B1 * | 4/2002 | Borowy et al. .......... 219/121.54 |
| 6,444,944 B2 * | 9/2002 | Schneider et al. ....... 219/121.54 |
| 6,815,639 B2 * | 11/2004 | Geissler ..................... 219/130.1 |
| 2003/0164645 A1 * | 9/2003 | Crandell, III ................... 307/80 |
| 2005/0109749 A1 * | 5/2005 | Karino et al. ............. 219/130.5 |
| 2005/0145611 A1 * | 7/2005 | Blankenship et al. ..... 219/130.1 |
| 2005/0286268 A1 * | 12/2005 | Teichmann ..................... 363/16 |

OTHER PUBLICATIONS

TESLAco, "About Technology", Dec. 1, 1998, TESLAco (Web page—http://www.teslaco.com/inverter.htm), p. 1 (See attached internet archive search for web address date).*
Thesis Paper by Joseph C. Schneider, "Battery Powered Plasma Cutter Using a Ćuk Converter," *A Report Submitted to the Faculty of the Milwaukee School of Engineering in Partial Fulfillment of the Requirements for the Degree of Master of Science in Engineering*, pp. 1-79, Milwaukee, WI.
Miller Electric Mfg. Co., Owner's Manual, "Spectrum Plus," OM-219.

* cited by examiner

*Primary Examiner* — Mark Paschall
(74) *Attorney, Agent, or Firm* — Fletcher Yoder, P.C.

(57) ABSTRACT

The present invention includes a plasma cutter having an input configured to receive welding power and a converter arranged according to a Ćuk topology and configured to automatically convert the welding power to plasma-cutting power.

2 Claims, 5 Drawing Sheets

SYSTEM AND METHOD FOR CONVERTING WELDING POWER TO PLASMA-CUTTING POWER

BACKGROUND OF THE INVENTION

The present invention relates generally to plasma cutting systems and, more particularly, to a system for receiving welding power from a welding device and converting the welding power to plasma-cutting power. A converter circuit is configured to receive the welding power and automatically adjust current and voltage levels, and invert polarity of the power to deliver plasma-cutting power to effectuate a plasma cutting process.

Plasma cutting is a process in which an electric arc is used for cutting a workpiece. Plasma cutters typically include a power source, an air supply, and a torch. The torch, or plasma torch, is used to create and maintain the plasma arc that performs the cutting. A plasma cutting power source is typically included to receive input power from one of two sources. Specifically, the plasma cutting power source is configured to receive alternating current (AC) power from either a transmission power receptacle or a generator. The plasma cutting power source conditions and converts the AC power to direct current (DC) output power appropriate for generating the plasma cutting arc and performing the desired plasma-cutting process.

However, plasma cutting operations are often desired at remote locations where neither a transmission power receptacle nor a generator is available. While these traditional AC power sources may not be available at such remote locations, welding systems having integrated engine-driven generators, or engine-driven welders, are often present at these remote locations because such field environments frequently require both plasma cutting and welding operations. While it would be desirable to utilize the generator integrated in an engine driven welder as a source of power for performing plasma-cutting processes, such has been precluded for a variety of reasons.

First, traditional plasma cutting systems are typically designed to receive AC power from either a transmission power receptacle or a generator. Accordingly, traditional plasma cutting systems are designed to convert AC power conforming to strict standards, for example 120 Volts (V), 60 Hz power, to plasma cutting power. While some engine-driven welders include auxiliary power receptacles for supplying 120V, 60 Hz power to power devices such as power tools and lights, these engine-driven welders typically have an output power capacity of less than 3 kilowatts (kW). As such, the power output capacity of these auxiliary outputs is insufficient to power plasma-cutting processes. That is, while these auxiliary outputs of engine-driven welders are designed to provide sufficient AC power, for example, 230 VAC to operate devices such as handheld power tools and lights, the power input requirements of plasma cutters typically surpass the output capabilities of these auxiliary outputs of engine-driven welders.

Second, while more substantial power outputs are typically available via the welding output of engine-driven welders, plasma cutting systems are designed to receive AC power conforming to specific constraints and cannot generally operate from DC welding power. That is, the power delivered from engine-driven welders to effectuate welding procedures is typically DC power that has been specifically conditioned to perform a desired welding process, for example 80 VDC. Therefore, traditional plasma cutters are incapable of utilizing the power delivered by engine-driven welders to the welding output.

Third, beyond typically being incapable of utilizing the type of power supplied to the welding output because the power is DC rather than AC, there are often additional impediments to utilizing power from the welding output to drive a plasma cutter. For example, welding processes such as stick welding typically require that the electrode of the welding torch be positively charged. On the other hand, plasma cutters generally require that the electrode be negatively charged. Therefore, not only is the power supplied via the welding output of the engine-driven welder inadequate for plasma-cutting, the polarity of welding power is reversed with respect to that required by the plasma cutter.

Accordingly, some plasma cutters have been developed to receive power from a welding output of an engine-driven welder. These systems utilize silicon controller rectifiers (SCRs) to perform the switching required to convert the welding power delivered by the engine-driven welder into power acceptable for plasma cutting.

However, though overcoming some of the drawbacks identified above, these plasma cutting systems having SCR-based power converters did not reverse the polarity of the power supplied by welding power source. As such, since welding operations often require that the welding electrode have a positive polarity, the operator must manually adjust the system to provide the plasma cutting electrode with a negative charge.

Furthermore, these systems typically require a rectified three-phase power supply to properly create the plasma cutting power. That is, when supplied with rectified single-phase power, these plasma cutters having SCR-based power converters are generally not capable of properly converting the rectified single-phase welding power to plasma cutting power. However, three-phase engine-driven welding power sources are typically significantly less common in the welding industry, which considerably reduces the compatibility of the plasma cutter with available engine-driven welders.

Also, these systems lack controls to stop the engine drive of the engine-driven welder from being overpowered and causing engine speed to fall. Therefore, it is possible for an operator to inadvertently draw more power than the engine-driven welder is capable of providing. As such, the engine is overpowered and speed drops. Correspondingly, the power delivered by the engine-driven welder drops and can continue to drop until the engine fails.

It would therefore be desirable to design a plasma cutting system that is capable of receiving rectified single-phase welding power and accurately converting the rectified single-phase welding power to plasma cutting power. Furthermore, it would be desirable to design a plasma cutting system capable of receiving DC welding power from an engine-driven welder, and having a DC to DC converter and control system capable of processing the received DC welding power and converting it to power necessary for generating a plasma cutting arc without overpowering the engine-driven welder. Additionally, the DC to DC converter should be configured to automatically invert the welding power voltage polarity for a desired plasma-cutting process. Also, it would be desirable that the DC to DC converter not adversely affect the size and portability of the plasma cutter.

BRIEF DESCRIPTION OF THE INVENTION

The present invention is directed to a system for plasma cutting that overcomes the aforementioned drawbacks. Specifically, the present invention includes a converter configured to receive welding power and automatically boost the voltage and invert the polarity of the welding power to convert the welding power to plasma cutting power. In this regard, the invention includes a plasma cutter that can be powered by the output of a welder and carry out a desired plasma cutting process.

Therefore, in accordance with one aspect of the present invention, a plasma cutter is disclosed that includes an input configured to receive welding power and a converter arranged according to a Ćuk topology and configured to automatically convert the welding power to plasma-cutting power.

In accordance with another aspect of the present invention, a plasma-cutting apparatus is disclosed that is configured to receive welding power from a welding power source and automatically adjust a polarity of the welding power and convert the welding power to plasma-cutting power for a plasma-cutting process.

According to another aspect, the present invention is directed to a plasma-cutting system that includes a first input configured to receive AC power and a second input configured to receive welding power. The plasma-cutting system also includes at least one multi-loop feedback control configured to control conversion of the welding power to plasma-cutting power and a plasma cutting output configured to deliver plasma-cutting power if either of the first input and the second input receives power.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
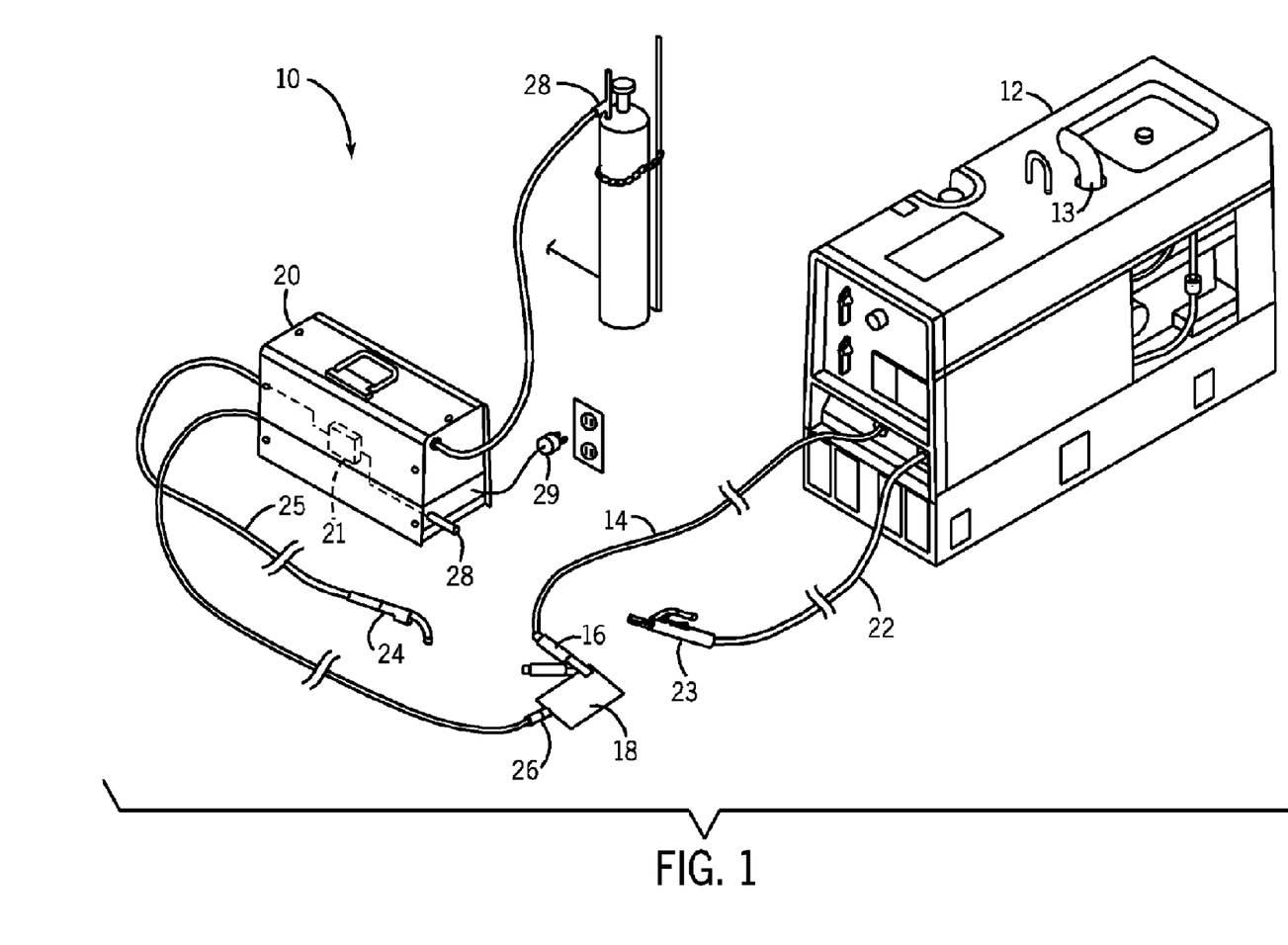
FIG. 1 is a perspective view of an engine-driven welder and a plasma cutting system incorporating the present invention.

Referring to FIG. 1, a plasma cutting system 10 is shown. The plasma cutting system is a high voltage system with maximum open circuit output voltages ranging from approximately 230 VDC to over 300 VDC. Additionally, a welding power source 12 is shown that is configured to deliver DC welding power to effectuate a welding process. According to one embodiment, the welding power source 12 is an engine-driven welder. As such, an exhaust port 13 extends from power source 12 and vents exhaust gas from an internal combustion engine (not shown) of the welding power source 12. While an engine-driven power source is shown, it is contemplated that power source 12 could also be configured to be powered by an external generator or a transmission power grid.

The welding power source 12 has a workpiece cable 14 and a clamp 16 designed to be connected to a workpiece 18 for welding. A welding power cable 22 extends from the welding power source 12 to a welding torch 23. For exemplary purposes, the welding torch 23 is shown as a stick welding torch. However, it is contemplated that the present invention may be configured to operate with essentially any welding torch configuration, for example, a metal inert gas (MIG) or tungsten inert gas (TIG) torch.

The plasma cutting system 10 includes a plasma cutter 20 that, as will be described, includes a converter 21 configured to receive welding power from the welding power source 12 and convert the welding power to plasma cutting power suitable for performing a plasma cutting process. Connected to the plasma cutter is a plasma cutting torch 24 via a cable 25. The cable 25 provides the plasma cutting torch 24 with plasma cutting power. Also connected to plasma cutter 20 is a work clamp 26 which is designed to complete the circuit with the workpiece 18 to be cut and/or welded.

To effectuate cutting of a workpiece, the plasma cutting torch 24 is placed in close proximity to the workpiece 18 connected to the clamp 26. That is, plasma cutter 20 delivers operational plasma cutting power to the torch 24 having a voltage necessary to effectuate a plasma cutting process.

As will be described in detail with respect to FIGS. 2-5, the converter 21 is configured to receive welding power from the welding power source 12 by connecting the welding torch 23 directly to an input receptacle 28 of the plasma cutter 20. Additionally, the plasma cutter 20 may include an AC power receptacle 29 configured to receive AC power from a transmission power receptacle. The converter 21 receives the welding power from the input receptacle 28 and automatically converts the welding power to plasma cutting power that is delivered to the plasma cutting torch 24 to cut the workpiece 18. For example, an operator may begin by performing a welding process on the workpiece 18 by connecting the workpiece clamp 16 of the welder power source 12 to the workpiece 18. When the operator later desires to perform a plasma cutting process on the workpiece 18, the operator need only to connect the welding torch 23 to the input receptacle 28 of the plasma cutter 20, connect the workpiece clamp 26 of the plasma cutter 20 to the workpiece 18, and the converter 21 automatically converts the welding power from the welding power source 12 to plasma cutting power to perform plasma cutting via the plasma cutting torch 24. That is, the converter 21 is configured to automatically boost the voltage of the welding power to a voltage suitable for plasma cutting and reverse the polarity of the welding power.

As will be described, the converter 21 is preferably arranged according to a Ćuk topology. As such, circuit design is simplified and increased reliability and efficiency over other DC to DC converters capable of inverting polarity is achieved. In particular, efficiencies as high as 90% or more may be achieved by the converter 21. However, it is contemplated that other converter topologies may also provide the desired performance characteristics.

Figure 2:
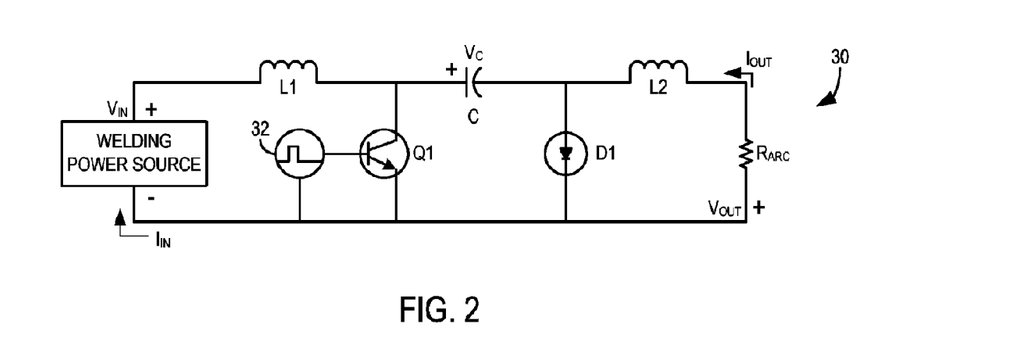
FIG. 2 is a schematic of a converter circuit configured to convert welding power to plasma cutting power in accordance with one embodiment of the invention.

Referring now to FIG. 2, a converter circuit 30 configured to convert welding power to plasma cutting power is shown. In a preferred embodiment, the converter circuit 30 is configured according to a Ćuk topology. The converter circuit receives welding power ($V_{in}, I_{in}$) from the welding power source 12 and converts the welding power to plasma cutting power ($V_{out} \cdot I_{out}$) that is supplied to a plasma cutting output, represented by a resistor $R_{ARC}$. For example, $V_{in}$ may range from approximately 25 VDC to 120 VDC and $I_{in}$ is typically less than 300 ADC; while $V_{out}$ may range from approximately 120 VDC to 240 VDC and $I_{out}$ may range from approximately 20 ADC to 55 ADC. The converter circuit 30 includes an input inductor L1 connected to the welding power source 12. It is contemplated that in order to achieve the desired plasma cutting power from the welding power supplied by the welding power source 12, inductor L1 may be an approximately 60 μH inductor. An output inductor L2 is connected to the plasma cutting output $R_{ARC}$. Again, it is contemplated that in order to achieve the desired plasma cutting power from the welding power supplied by the welding power source 12, inductor L2 may be an approximately 700 μH inductor. Further, for purposes of this example, the plasma cutting output $R_{ARC}$ is represented by a 2.182Ω resistor.

An energy transfer capacitor $V_C$ is connected between the two inductors L1, L2. It is contemplated that the energy transfer capacitor $V_C$ may be an approximately 250 μF capacitor. Two switches Q1 and D1 are configured to alternately tie L1 or L2 to a common connection. Specifically, transistor Q1 is configured to be biased by a pulsing control 32 and diode D1 is configured to switch ON and OFF in response to the switching of transistor Q1.

As shown, transistor Q1 is preferably an insulated gate bipolar transistor (IGBT) type transistor. As such, the converter circuit 30 is significantly reduced in size and weight when compared to converters employing SCRs. Furthermore, the switching capabilities of IGBT transistors are significantly higher than SCRs. Accordingly, the converter circuit is capable of providing increased accuracy and control over systems employing SCR-based converters. That is, as will be described, it is contemplated that multiple control loops may be utilized with the converter circuit to provide a variety of improved controls over the conversion of power from welding power to plasma cutting power.

In particular, when the converter 30 receives power from the welding power source 12, transistor Q1 turns ON thereby allowing current to flow from the welding power source 12 through inductor L1 and transistor Q1. As such, the energy transfer capacitor C discharges through transistor Q1 and inductor L2 into the plasma cutting output load $R_{ARC}$. As such, the input voltage from the welding power source 12 is inverted when supplied to the plasma cutting load $R_{ARC}$.

As the voltage stored in energy transfer capacitor C is discharged, the current flowing through inductor L2 builds. When Q1 is switched off by the pulsing control 32, diode D1 turns ON. Accordingly, inductor L1 attempts to sustain the flow of current therethrough transferring energy into energy transfer capacitor C through diode D1. Therefore, plasma output load $R_{ARC}$ receives power from inductor L2 and diode D1. As such, power appropriate for performing plasma cutting is supplied to plasma output load $R_{ARC}$ by converting welding power from the welding power source 12.

Figure 3:
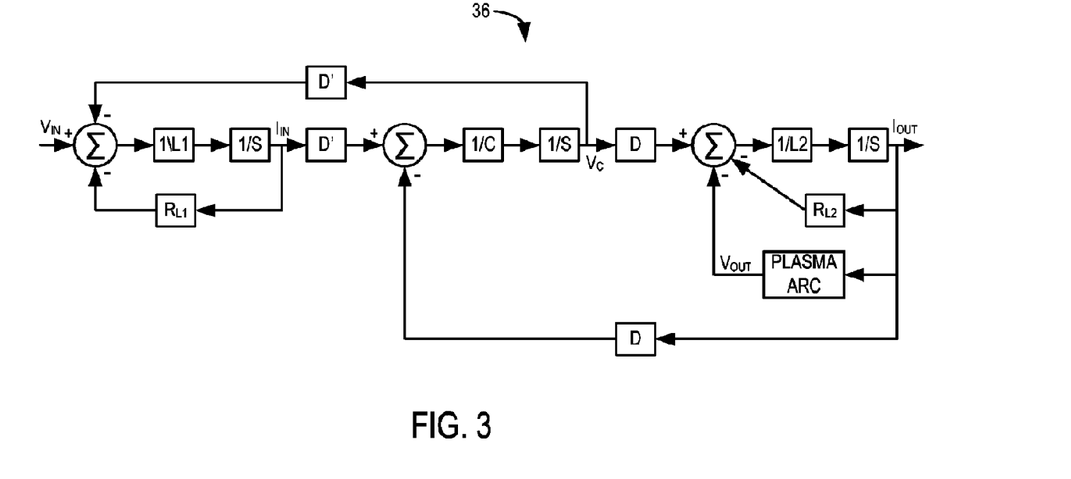
FIG. 3 is a Laplace domain block diagram of the converter circuit of FIG. 2 in accordance with another embodiment of the invention.

Referring now to FIG. 3, a Laplace domain block diagram 36 of the converter circuit of FIG. 2 is shown. To derive the Laplace domain block diagram 36, the relationships of the components of the converter 30 of FIG. 2 are defined by a set of variables. Specifically, the duty cycle transfer function defined by $k_{duty}=D/(1-D)$, where D is the duty cycle of the transistor Q1 of FIG. 2. Additionally, the voltage transfer function of the converter circuit is defined by $k=V_{out}/V_{in}$. Similarly, the current transfer function of the converter circuit is defined by $1/k=I_{out}/I_{in}$. The voltage $V_c$ across energy transfer capacitor C is represented by the sum $V_{in}+V_{out}$. As such, the transfer function from energy transfer capacitor voltage $V_c$ to the plasma cutting voltage output $V_{out}$ is defined by $D=V_{out}/V_c$. Accordingly, the overall converter power balance is the product of $V_{out} \cdot I_{out}$, which is equal to $V_{in} \cdot I_{in} \cdot \text{eff}$, wherein eff is the circuit efficiency.

With these relationships established, desirable $V_{out}$ and $I_{out}$ values can be selected. For example, $V_{out}$ can be selected to be 120 VDC and $I_{out}$ selected to be 55 ADC. Accordingly, for exemplary purposes, 120 VDC and 55 ADC are defined as a per unit (pu) values of $V_{out}$ and $I_{out}$, respectively. Therefore, according to this example, k, which is equal to $V_{out}/V_{in}$, is defined as 120/36 or 3.333. Further, the duty cycle D, which is defined by $k/(1+k)$, is 3.33/(1+3.33) or 0.769. As such, 0.769 is defined as 1 pu.

Referring again to FIG. 3, the block diagram 36 of the converter circuit 30 of FIG. 2 in the Laplace domain is shown. The operation of transistor Q1 and diode D1 of FIG. 2 are represented by the transistor duty cycle D and diode duty cycle D', respectively. Accordingly, the transistor duty cycle D plus the diode duty cycle D' yields unity. Resistors $R_{L1}$ and $R_{L2}$ represent the resistive voltage drop associated with inductors L1 and L2, respectively.

Accordingly, given the above-listed values, at a per unit (0.769) transistor duty cycle D, poles are yielded at (−70+/−j 347) Hz and (−355) Hz and zeros are yielded at (86+/−j 287) Hz. Therefore, without any feedback compensation, the converter 36 has a tendency to provide an oscillating plasma cutting output power ($V_{out} \cdot I_{out}$).

Figure 4:
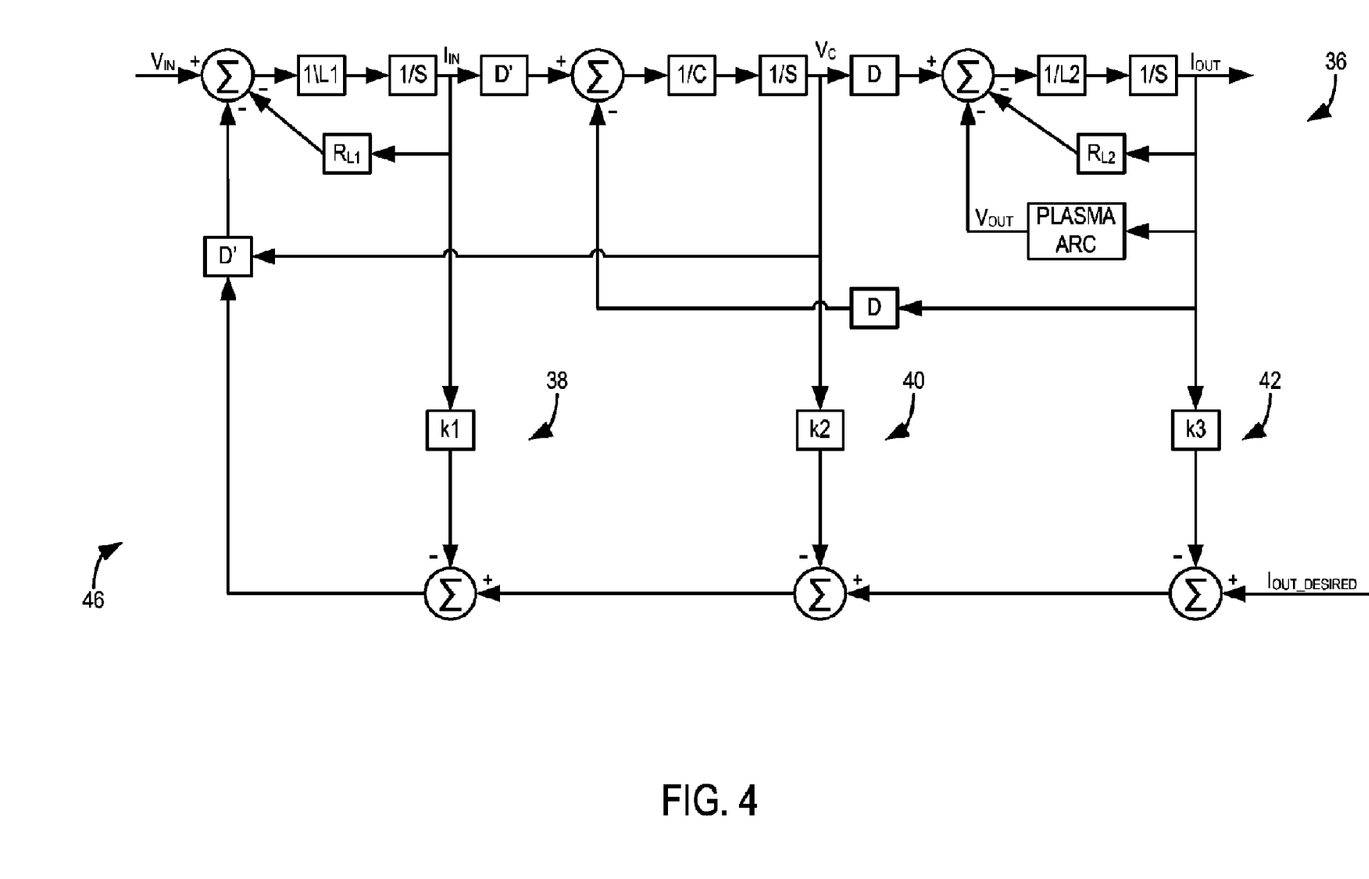
FIG. 4 is a Laplace domain block diagram of the converter circuit of FIG. 2 including multi-loop state variable feedback control loops in accordance with another embodiment of the invention.

To rectify the oscillatory nature of the converter configuration shown in FIG. 3, state variable feedback is employed, as shown in FIG. 4. In this embodiment of the converter circuit 36, three feedback loops 38, 40, 42 have been added to the converter 36 to control the plasma cutting power output ($V_{out} \cdot I_{out}$). As such, proportional gains k1, k2, and k3 have been added to the converter 36 to stabilize the plasma cutting power output ($V_{out} \cdot I_{out}$). Accordingly, a state variable topology of the converter, generally designated 46, is formed. The state variable topology 46 adds zeros to the converter circuit 36 that increase system stability. That is, since, for any given operating point, D and D' are constant, the closed loop poles can be identified at a desired location. For example, employing the previously stated exemplary values, one set of gains that provides desirable transient response are k1=32 pu, k2=24 pu, and k3=6 pu. While it is recognized that these gains are not unique and many other equivalent solutions are possible, they provide closed loop poles at (−513+/−j 475) Hz and (−80, 970) Hz.

By moving the pole of the input inductor L1, the state variable topology of the converter 46 performs similarly to a second order system with a damping factor of approximately 0.707. Furthermore, the zeros are removed from closed loop transfer function.

Figure 5:
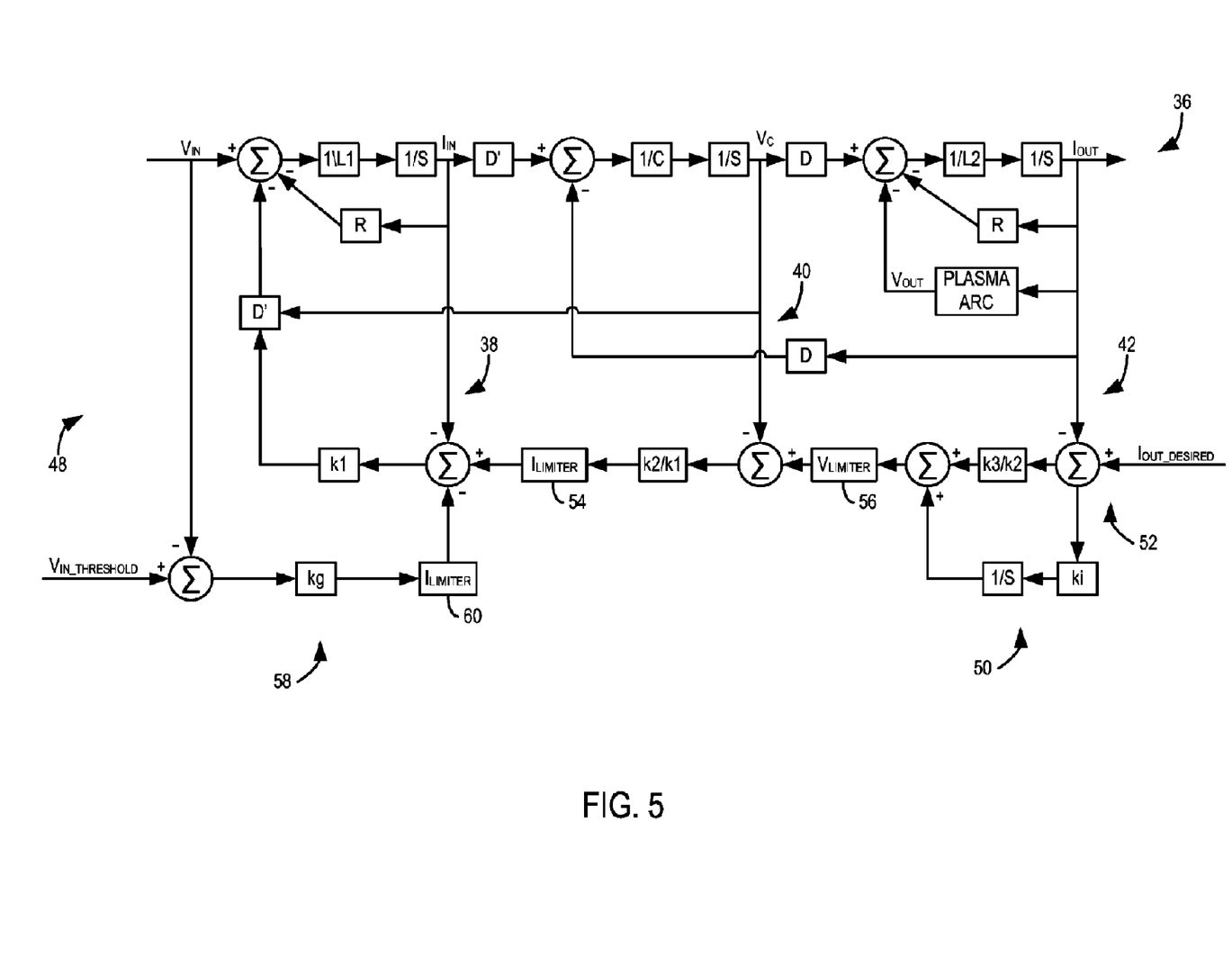
FIG. 5 is a Laplace domain block diagram of the converter circuit of FIG. 2 including multi-loop state variable feedback in accordance with yet another embodiment of the invention.

Referring now to FIG. 5, the converter 36 can be further modified to provide greater control over the power drawn from the welding power source and the output provided to the plasma cutting torch by augmenting the state control loops 38, 40, 42. Specifically, FIG. 5 shows a Laplace domain block diagram of the converter 36 with additional augmentation to form a cascade topology, generally designated 48. The cascade form of the converter 48 includes an integral regulator 50 added on an output current loop 52 for zero steady state error correction.

In the cascade converter form 48, all three state variables ($I_{in}$, $V_C$, and $I_{out}$) can be independently controlled by the corresponding three gains (k1, k2/k1, and k3/k2) to achieve a desired value. Gain k1, which controls input current, $I_{in}$, allows the converter to draw a consistent constant current input from the welding power source. That is, input current $I_{in}$ is monitored and limited by a first limiting block 54 to prevent overheating in inductor L1 and transistor Q1 of FIG. 2.

Gain k2/k1, which controls the voltage on energy transfer capacitor C of FIG. 1, allows the converter to maintain a substantially constant voltage across the energy transfer capacitor. Specifically, the voltage applied to energy transfer capacitor C is monitored and limited by a second limiting block 56 to prevent the voltage on energy transfer capacitor C and transistor Q1 of FIG. 1 from exceeding acceptable limits. By limiting the maximum voltage applied to the energy transfer capacitor, the plasma cutting output voltage $V_{out}$ is also limited. As such, the open circuit voltage is set for proper starting of the plasma cutting processes.

The third controlled variable is designed to maintain the desired constant current output necessary for plasma cutting processes. Gain k3/k2, in combination with integral gain ki, which together controls the plasma cutting output current, $I_{out}$, allows the converter 36 to deliver a constant current output $I_{out}$. That is, once an operator sets the desired output current (Desired $I_{out}$), gains k3/k2 and ki work in concert to sample $I_{out\_DESIRED}$ and compare it to the actual $I_{out}$ to keep the actual $I_{out}$ substantially equal to the $I_{out\_DESIRED}$.

In addition to the augmented state feedback loops 38 40, 42, a fourth control loop 58 and corresponding gain (kg) may be added to control the input voltage from the welding power source $V_{in}$. In particular, if the welding power source is an engine-driven welder, the output power of an engine-driven welder is limited by the output power limits of the engine of the engine-driven welder. Once this limit is reached, attempting to draw additional power reduces the power delivered by the engine-driven welder to the plasma cutter. Specifically, should the limits of the engine-driven welder be reached, the input voltage $V_{in}$ to the cascade converter 48 decreases. The fourth loop 58 is configured to prevent the plasma cutter from drawing power in excess of the output capabilities of the engine-driven welder. As such, the plasma cutter is permitted to utilize the maximum power from any given engine-driven welder without attempting to draw power in excess of the capabilities of the engine-driven welder.

Specifically, the fourth control loop 58 is configured to monitor $V_{in}$ and to determine when and if $V_{in}$ falls below a predetermined threshold. If $V_{in}$ falls below the predetermined threshold, the deviation from the predetermined threshold is multiplied by gain kg and applied to an input current limit block 60 to be subtracted from the input current $I_{in}$. Therefore, a limit on the amount of current that can be drawn from the engine-driven welder, $I_{in}$, is achieved.

Figure 6:
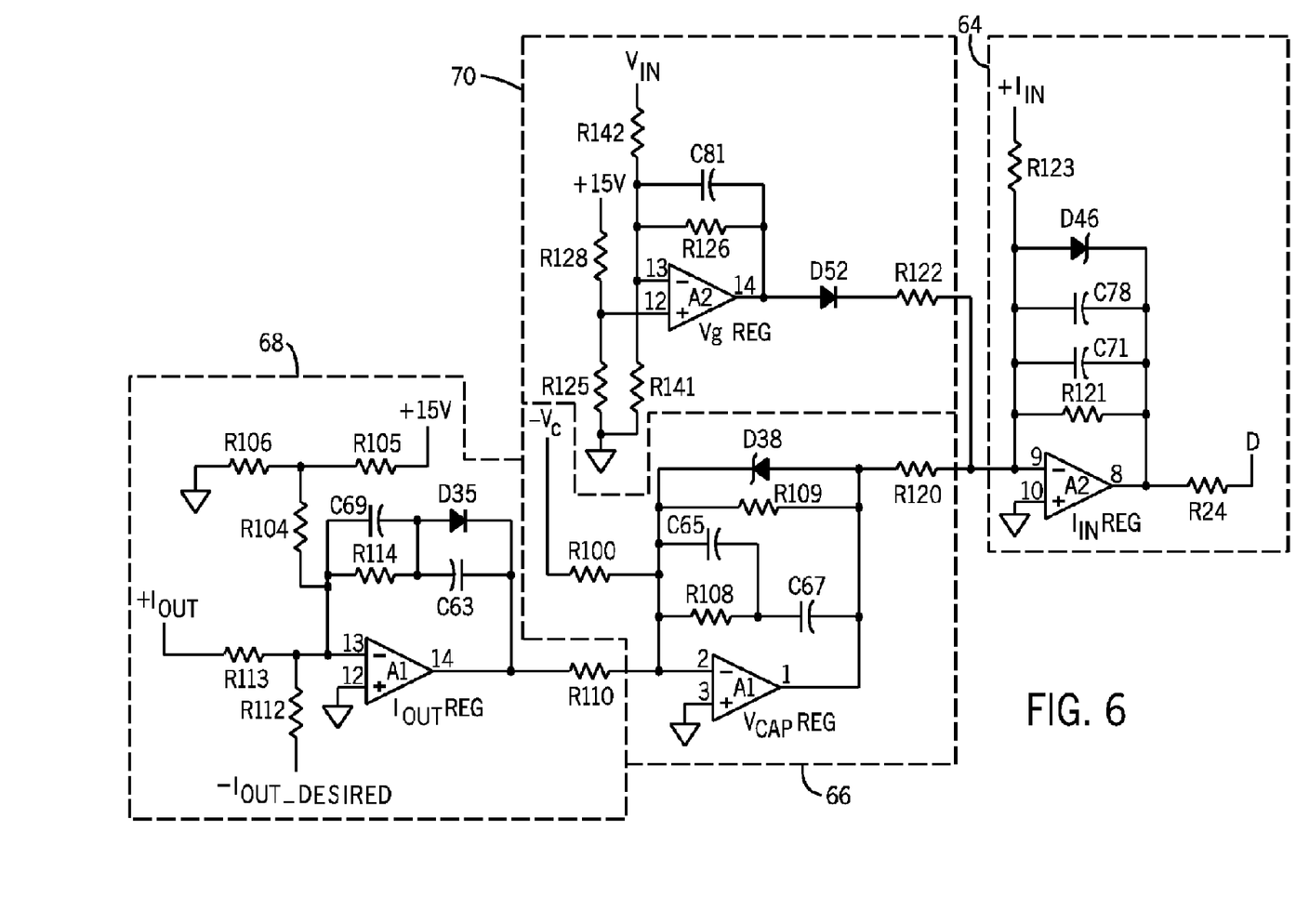
FIG. 6 is a schematic of a converter circuit arrangement configured to convert welding power to plasma cutting power in accordance with a further embodiment of the invention.

Referring now to FIG. 6, one embodiment of a circuit for the above-described converter is shown. That is, an exemplary compilation of circuit components is shown in FIG. 6; however, it is contemplated that other circuit configurations and component values may be equivalently utilized.

As previously stated, exemplary values of $V_{out}$ of 120 VDC and $I_{out}$ of 55 ADC are selected as per-unit values. Accordingly, the gain, k, which is equal to $V_{out}$ divided by $V_{in}$, equals 3.333. Therefore, the duty cycle D equals 0.769, which is 1 pu. Also, for exemplary purposes, a clock frequency of 15 kHz is selected.

In order to achieve maximum plasma cutting output current $I_{out}$, the integral gain, ki, is selected to be as large as possible without including any overshoot. Furthermore, in order to keep any ripple reduced at the pulse width modulator (PWM) comparator, gain k1 is dropped to 8.0 and gain k3 is increased to approximately 20.0. Accordingly, augmented values are derived whereby the duty cycle D is equal to 0.769, gain k1 is 8, gain k2/k1 is 3, and gain k3/k2 is 0.83. Accordingly, the limits for $I_{in}$ and $V_C$ are 240 ADC and 300 VDC, respectively. As such, these values are used as the per-unit values.

Next, the component values for regulating $I_{in}$ using the previously-described gain k1 are selected. Referring now to the components forming the $I_{in}$ regulator 64, values will be selected to achieve the performance characteristics previously described for feedback loop 38 of FIGS. 4 and 5. According to one embodiment, the PWM has a 2.5 V ramp. Therefore, at the established duty cycle of 0.769, the rated voltage applied to the PWM is 1.92 V (1 pu) at A2 pin 8. The $I_{in}$ current feedback is ratio is 1 V=200 A. Furthermore, the per unit +$I_{in}$ rated feedback voltage is 0.275 VDC. Resistor R121 is selected to have a value of approximately 100 kΩ. Therefore, since gain k1 is selected to be 8, R123 should be selected to have a value of approximately 1.79 kΩ. That is, because k1 is at 8.0 and is defined by (R121/R123)*(Base$_{IN}$/Base$_{OUT}$), or 100 k/R123·(0.275/1.92), R123 has a value of approximately 1.79 kΩ. Accordingly, R123 is preferably selected to be a 1.74 kΩ resistor.

In order to determine pole placement while only tolerating a 10% current ripple, the voltage is calculated by 0.1V*100/1.74, or 5.75 V. As a reduction ratio of about 10:1 is necessary, the capacitance of the $I_{in}$ regulator 64 may be equal to approximately 1/(2π10 kΩ·15 kHz), or 0.001 uF. Accordingly, to one embodiment, a capacitance of 660 pF is selected. As a result, a pole at 2.4 kHz is created that lowers the crossover of the $I_{in}$ regulator 64 to less than 50% of the switching frequency. The loop crossover point without the capacitor is created at approximately 8/(2π*L1), or approximately 21 kHz. By adding a zero at the crossover frequency some phase margin may be added back into the $I_{in}$ regulator 64. As such, a resistor may be added in series with the parallel combination of capacitor C78 and capacitor C71. Preferably, a resistor having a value of approximately 10 kΩ is added to maintain a desired ripple voltage requirement.

Next, the component values for controlling the energy transfer voltage $V_C$ using the previously-described gain k2 are selected. An important function of the $V_C$ regulator 66 is to act as an input current limiting command. This is achieved by allowing the Op Amp $V_{CAP}$Reg to saturate or, alternatively, by adding a Zener diode to the $V_C$ regulator 66. According to one embodiment, a diode D38 in conjunction with a resistor R120 is utilized to act as an input current limiting command. The relationship of these components is defined by 10V/R120=$I_{in}$/R123. Therefore, to set a 200 amp limit with and a scaling of 1V=200 A, R120 has a value of approximately 17.4 kΩ.

As previously described, the Vc voltage control loop has a proportional gain, k2/k1, of 3.0. The −Vc voltage feedback ratio is −1 V=100V. As such, the rated feedback voltage for −$V_C$ is 120/100, or 1.20V, which is 1 pu. Therefore, the rated voltage applied to pin 1 of $V_{CAP}$Reg is (17.4 k/1.74 k)·0.275, or 2.75V, in order to match the $I_{in}$ current feedback line.

The value of resistor R108 is selected to be 150 kΩ. As previously described, gain k2/k1 is 3.0. Therefore, since k2/k1 is equal to (R108/R100)·(Base$_{IN}$/Base$_{OUT}$), or 3=150 k/R100·(1.20/2.75), R100 should have a value of approximately 21.8 kΩ. According to one embodiment, R100 has a value of 20 kΩ.

In accordance with one embodiment, R108 is the only gain element. However, in this case, the $V_C$ regulator loop 66 has marginal gain to control Vc, which can be attributed to a general lack of stiffness in the circuit. As such, according to another embodiment, a new gain resistor R109 is selected to have a value of approximately 562 kΩ, to achieve a high gain at DC and to provide suitable open circuit voltage control. However, with R109 having a value of approximately 562 kΩ, the $V_C$ regulator loop 66 may oscillate. Accordingly, it is desirable to include a low proportional gain at crossover frequency such as can be achieved by adding a capacitor C67 having a value to be utilizing at ⅓ the oscillating frequency. As such, capacitor C67 should be defined by 1/(2*π*150 kΩ*1 kHz/3), or 0.003 μF. According to one embodiment, a capacitance value of 0.0033 μF is selected. Similarly, in order to maintain high frequency filtering, a pole should be kept at 2 kHz. Therefore, capacitor C65 is defined by 1/(2π*150 kΩ·2 kHz), or 531 pF. According to one embodiment, a capacitance value of 560 pF is selected. Therefore, the low frequency pole break is at 1/(2π·562 kΩ·0.0033 μF), or 86 Hz, which is about ⅓ of the zero. As such, the loop gain crosses 0 db at about 30 db/decade. Additionally, these values create an average lag of approximately 90°/2, or 45°.

One skilled in the art will appreciate that rolling the gain off may be utilized to select a variety of equivalently suitable values for any or all of the above-described components. That is, the above described method of "Pole Zero Dovetailing" may be utilized to select a variety of equivalent or equally suitable component values.

Next, the component values for regulating controlling output current $I_{out}$ using the previously-described gain k3 should be selected. An important function of the $I_{out}$ regulator 68 is to act as an energy transfer or Ćuk capacitor voltage $V_C$ limiting command. Again, this function may be achieved by allowing the Op Amp $I_{out}$Reg to saturate. Therefore, the pin 14 of the Op Amp $I_{out}$Reg performs this function in conjunction with R110. In particular, 13.5V/R110=Vc/R100. For a 295 V limit and a scaling of 1V=100V, the value of R110 is selected to be 92 kΩ. However, according to one embodiment, the value of R110 is preferably 75 kΩ.

As such, $I_{out}$ regulator loop 68 has a proportional gain of approximately 0.83. Additionally, the rated feedback voltage for +$I_{out}$ is 55/13.3, or 4.14V, 1 pu. The rated voltage at pin 14 of Op Amp $I_{out}$ is (120/100)/20 kΩ·75 k, or 4.50V, in order to match the $V_C$ voltage feedback line.

The value of resistor R114 is selected to be 100 kΩ. As previously described, gain k3/k2 is 0.83. Therefore, gain k3/k2, 0.83, is equal to (R114/R113)·(Base$_{IN}$/Base$_{OUT}$) or 100k/R113·(4.14/4.50). However, according to this example, it is contemplated that the value of R113 may be selected anywhere from approximately 112 kΩ to 82.5 kΩ.

The low frequency pole is selected at 4.8 kHz for ripple filtering. As such, the $I_{in}$ regulator current loop 68 has an integral gain of 2400 (v=(1/C)Tidt). Therefore, the value for capacitor C63 can be selected according to integral gain=t/(R113*C63)·(Base$_{IN}$/Base$_{OUT}$). With t selected as 1.0 second, C63 is defined by 1/(82.5 kΩ*2400)·(4.14/4.5), or 0.00465 μF. According to one embodiment, a value of 0.0047 μF may be used for C63.

The $I_{out}$ current command ratio is −5V=60 A. The command resistor R112 is scaled to the unit gain feedback signal such that R112 is equal to (55/60)*5)*(82500/4.14), or 91.4 kΩ. According to one embodiment, a value of 90.9 kΩ may be selected for R112.

The values for the $V_{in}$ regulator loop regulator 70 may be selected in a manner similar to the above described methods of selecting component values for the $I_{in}$ regulator 64, the Vc regulator 66, and the $I_{out}$ regulator 68. That is, as previously described, the $V_{in}$ regulator loop 70 is configured to monitor $V_{in}$ and to determine when and if $V_{in}$ falls below a predetermined threshold. Accordingly, values may be selected such that should $V_{in}$ fall below the predetermined threshold, the deviation from the predetermined threshold is multiplied by a gain kg and applied to the $I_{in}$ regulator 64 to be subtracted from the input current $I_{in}$. Therefore, a limit on the amount of current that can be drawn from the engine-driven welder, $I_{in}$, is achieved thereby limiting the potential for overpowering the engine of the engine-driven welder.

While the Ćuk topology is widely regarded as a difficult topology to control, by implementing the above-described state variable approach, a converter utilizing the Ćuk topology is stabilized and necessary functionality to convert welding power to plasma cutting power is achieved by controlling the above-described state variables.

Additionally, by converting welding power delivered from the welding output of a generator, it is not necessary to electrically isolate the plasma cutter input. That is, should the plasma cutter be designed to operate solely from welding power, rather than from AC transmission power, an isolation device, typically a transformer, that would otherwise be necessary to isolate the AC transmission line from the plasma cutting power output can be eliminated and thereby reduce weight, size, and cost of the plasma cutter.

It is contemplated that the above described invention can be embodied in a plasma cutter having an input configured to receive welding power and a converter arranged according to a Ćuk topology and configured to automatically convert the welding power to plasma-cutting power.

It is further contemplated that the current invention can be embodied in a plasma-cutting apparatus that is configured to receive welding power from a welding power source and automatically adjust a polarity of the welding power and convert the welding power to plasma-cutting power for a plasma-cutting process.

It is also contemplated that the present invention can be embodied as a plasma-cutting system that includes a first input configured to receive AC power and a second input configured to receive welding power. The plasma-cutting system also includes at least one multi-loop feedback control configured to control conversion of the welding power to plasma-cutting power and a plasma cutting output configured to deliver plasma-cutting power if either of the first input and the second input receives power.

The present invention has been described in terms of the preferred embodiment, and it is recognized that equivalents, alternatives, and modifications, aside from those expressly stated, are possible and within the scope of the appending claims.

What is claimed is:

1. A plasma cutter comprising:
   an input configured to receive DC welding power from a welder;
   a converter arranged according to a Ćuk topology and configured to automatically convert the DC welding power to plasma-cutting power; and
   an active feedback loop configured to monitor and control current of the DC welding power based upon comparison of output current and a desired output current to maintain a thermal output of the converter below a desired limit.

2. A plasma cutter comprising:
   an input configured to receive DC welding power from a welder, wherein the input is configured to receive an end of a welding torch connected to the welder to receive DC welding power from the welder;
   a converter arranged according to a Ćuk topology and configured to automatically convert the DC welding power to plasma-cutting power and an active feedback loop configured to monitor and control current of the DC welding power based upon comparison of output current and a desired output current to maintain a thermal output of the converter below a desired limit.

\* \* \* \* \*